F. W. BAADEN.
FLEXIBLE CONNECTION.
APPLICATION FILED MAY 21, 1909.
960,061.
Patented May 31, 1910.
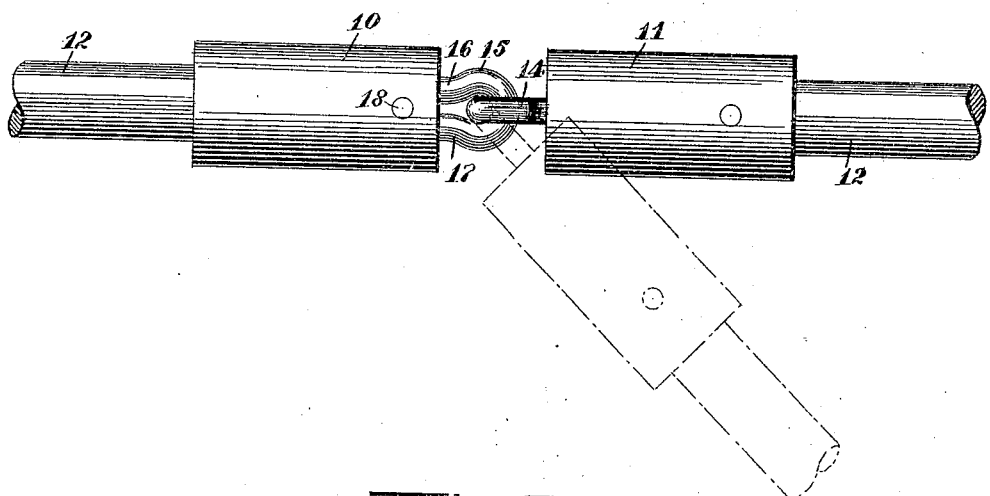
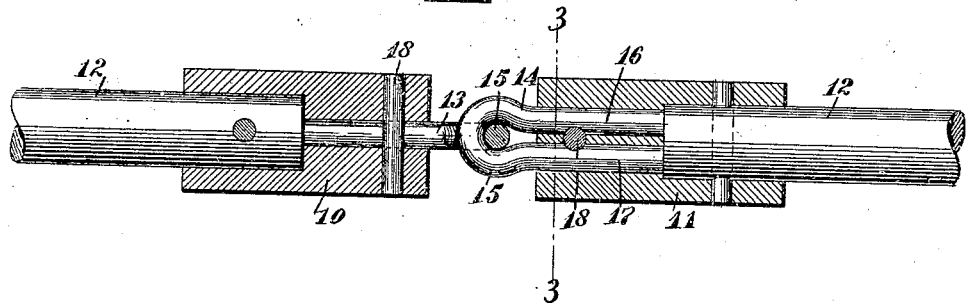
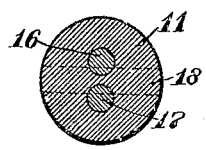
WITNESSES
INVENTOR
Frank W. Baaden
BY
ATTORNEYS

UNITED STATES PATENT OFFICE.

FRANK WILLIAM BAADEN, OF NEWARK, NEW JERSEY.

FLEXIBLE CONNECTION.

960,061.   Specification of Letters Patent.   Patented May 31, 1910.

Application filed May 21, 1909. Serial No. 497,464.

*To all whom it may concern:*

Be it known that I, FRANK W. BAADEN, a citizen of the United States, and a resident of Newark, in the county of Essex and State of New Jersey, have invented a new and Improved Flexible Connection, of which the following is a full, clear, and exact description.

This invention relates to certain improvements in flexible connections especially designed for use in connecting rotating members. My improved connection in itself constitutes a universal joint, and may be used in any form of apparatus or machinery in which universal joints are desired. It is particularly desirable for use in small flexible shafts. In my improved connection I employ two interlocking links, movable in respect to each other, and so connect the links to the adjacent members that said links may be very readily removed and replaced when they become worn. The main feature of my invention resides in the construction of these links and the means employed for securing them in position.

Reference is to be had to the accompanying drawings, forming a part of this specification, in which similar characters of reference indicate corresponding parts in all the figures, and in which—

Figure 1 is a side elevation of portions of a flexible shaft including my improved universal joint; Fig. 2 is a longitudinal section through a portion of a joint; and Fig. 3 is a transverse section on the line 3—3 of Fig. 2.

My improved joint may be used for connecting two members of any suitable character. These two members as illustrated, comprise two collars or sleeves 10 and 11, each having a centrally-disposed recess in its outer end adapted to receive a shaft section 12. Two links 13 and 14 serve to connect the two links together and to permit of the desired movement of one in respect to the other. Each link has a ring portion 15 and two anchoring pins or studs extending into the corresponding recess in the end of the sleeve. The two links are each preferably made from a single cylindrical rod bent to form the ring portion 15, with the two end portions of the rod forming the two pins or studs 16 and 17. These two terminal portions are arranged parallel to each other and spaced a short distance apart. Each sleeve 10, 11, is provided with two cylindrical openings extending into the end thereof and of such size and so disposed in respect to each other, as to receive the two terminal portions of the rod.

For securing the link in position, each sleeve 10, 11, is provided with a transversely-extending passage at right angles to the plane of the two pins 16 and 17, and of a diameter slightly greater than the distance between the adjacent sides of the two parallel pins. The two pins are each provided with recesses in their adjacent faces and so disposed that when the pins are forced inwardly to the limiting position, said recesses will come into alinement with the transverse passage through the sleeve. A pin 18 is then driven through the sleeve and through the recesses in the adjacent sides of the two pins 16 and 17. This transverse pin 18 positively prevents the link from being drawn out of the sleeve, inasmuch as the pins 16 and 17 fit their respective passages, and the transverse pin is of a greater width than the distance between said pins 16 and 17. The internal diameter of each ring 15 is substantially equal to the diameter of the rod going to make up the ring, so that when the two rings are assembled, as illustrated, each ring and its corresponding member can move in respect to the other ring, but there can be little, if any, lost motion.

Whenever one of the links becomes worn, it is merely necessary to drive out the corresponding transverse pin 18, and the link may then be very readily pulled out of its corresponding member. A new link may be inserted and the same pin 18 driven back into place. The insertion of a new link need take only a few seconds, and as the links themselves are formed out of a single piece of rod bent to the desired shape, they are very inexpensive.

Having thus described my invention, I claim as new and desire to secure by Letters Patent:

1. A universal joint, comprising two members, each having two longitudinal openings spaced a short distance apart and a transverse opening between and at right angles to the longitudinal openings, said transverse opening being of a diameter greater than the distance between the longitudinal openings, two links each formed of a rod bent to form an eye and two spaced and parallel arms having recesses in their adjacent sides, the eyes of the links being in engagement with each other and the arms of the links extending into the longitudinal openings of the members with their recesses opposite the transverse openings of the members, and pins fitting in the transverse openings of the members and the recesses of the arms of the links.

2. A universal joint, comprising two members, each having two longitudinal openings spaced a short distance apart and a transverse opening between and at right angles to the longitudinal openings, said transverse opening being of a diameter greater than the distance between the longitudinal openings, two links, each formed of a rod bent to form an eye and two spaced and parallel arms, the eyes of the links being in engagement with each other and the arms of the links extending into the longitudinal openings of the members, and pins fitting in the transverse openings of the members and in firm engagement with the arms of the links.

In testimony whereof I have signed my name to this specification in the presence of two subscribing witnesses.

FRANK WILLIAM BAADEN.

Witnesses:
 GEORGE KRIEGBAUM,
 ERNEST FISCHER.